(12) United States Patent
Chundury et al.

(10) Patent No.: US 6,838,494 B2
(45) Date of Patent: Jan. 4, 2005

(54) LIGHT REFLECTING POLYMERIC COMPOSITIONS

(75) Inventors: Deenadayalu Chundury, Newburgh, IN (US); Richard Abrams, North Royalton, OH (US); Ronald M. Harris, Alpharetta, GA (US); Mir Ali, Bryan, OH (US); Theophilus G. McGee, II, Mt. Carmel, IL (US); Susan T. Schmidt, Evansville, IN (US)

(73) Assignee: Ferro Corporation, Cleveland, OH (US)

( * ) Notice: Subject to any disclaimer, the term of this patent is extended or adjusted under 35 U.S.C. 154(b) by 19 days.

(21) Appl. No.: 10/334,040

(22) Filed: Dec. 30, 2002

(65) Prior Publication Data

US 2004/0125603 A1 Jul. 1, 2004

(51) Int. Cl.[7] ................................................. C08K 3/22
(52) U.S. Cl. ..................... 523/135; 523/172; 523/220; 524/409; 106/441; 106/455
(58) Field of Search ................................ 523/135, 172, 523/220; 524/409; 106/441, 455

(56) References Cited

U.S. PATENT DOCUMENTS

| | | | | |
|---|---|---|---|---|
| 3,951,899 | A | * | 4/1976 | Seiner ........................ 524/388 |
| 4,125,509 | A | * | 11/1978 | Vostovich .................... 524/291 |
| 4,353,961 | A | * | 10/1982 | Gotcher et al. ............. 428/380 |
| 5,079,283 | A | | 1/1992 | Burditt et al. |
| 5,137,575 | A | * | 8/1992 | Yasuki et al. ............... 106/441 |
| 5,194,482 | A | | 3/1993 | Chundury et al. |
| 5,215,580 | A | * | 6/1993 | Elfenthal et al. ............ 106/441 |
| 5,759,256 | A | * | 6/1998 | Stramel ....................... 106/439 |
| 5,969,027 | A | | 10/1999 | Chundury et al. |
| 6,150,442 | A | | 11/2000 | Chundury et al. |
| 6,186,649 | B1 | | 2/2001 | Zou et al. |
| 6,518,344 | B1 | | 2/2003 | Chundury et al. |

FOREIGN PATENT DOCUMENTS

| | | | | | |
|---|---|---|---|---|---|
| EP | | 994296 A1 | * | 4/2000 | ............. F21V/1/22 |
| JP | | 2000026664 A | * | 1/2000 | ............ C08L/23/00 |
| SU | | 307084 A | * | 6/1971 | ............ C08F/45/54 |

OTHER PUBLICATIONS

JPO machine translation of JP 2000/026664A (Jan. 25, 2000) Ito et al.*
USPTO obtained translation for SU 307084 (Jun. 21, 1971) Antipina et al.*

* cited by examiner

*Primary Examiner*—Matthew A. Thexton
(74) *Attorney, Agent, or Firm*—Rankin, Hill, Porter & Clark LLP

(57) ABSTRACT

The present invention provides a light reflecting polymeric composition that includes at least one halogenated-flame-retardant-additive-free polymer having dispersed therein a pigment package including a combination of $Sb_2O_3$ and $TiO_2$. The $Sb_2O_3$ and $TiO_2$ preferably have an average particle size within the range of from about 0.05 µm to about 1.0 µm, and more preferably about 0.2 µm. When used in combination, the $Sb_2O_3$ and $TiO_2$ pigments synergistically interact together to provide a polymeric composition exhibiting a reflectivity that is substantially higher than can be obtained by the use of either of the pigments alone.

19 Claims, 4 Drawing Sheets

HORIZONTAL LIGHT OUTPUT PROFILE

LIGHT REFLECTING POLYMERIC COMPOSITIONS

BACKGROUND OF THE INVENTION

1. Field of Invention

The present application relates to light reflecting polymeric compositions.

2. Description of Related Art

Most light sources emit light in the visible range of the electromagnetic spectrum (i.e., wavelengths from about 400 nm to 700 nm) in all directions, which necessitates the use of one or more reflectors to concentrate the light and direct it in the desired location. Studies have shown that light, which travels in a straight line, typically reflects or "bounces" off the surface of one or more reflectors in a lighting fixture an average of five times before it is properly directed in the desired location. For example, if the reflector material reflects 90% of the light, then 90% of the emitted light is reflected on the first reflection or "bounce" and 10% of the light is absorbed by the reflector material. On the second "bounce", 90% of the light reflected from the first bounce is reflected a second time, and 10% of that reflected light is then absorbed by the reflector material. After five "bounces", only about 59% of the light originally emitted from the light source is available to reach the targeted area (90.000%×90.000%×90.000%×90.000%×90.000%= 59.049%).

For many years, efforts have been made to develop highly reflective polymeric materials because relatively small improvements in the percent reflectivity of polymeric compositions can have a substantial effect on the amount of light directed in the desired location and the amount of energy needed to produce the required lighting. Using the same example as above, if the percent reflectivity of the reflector material can be increased by 8.000% (i.e., to 98.000%), then about 90.392% of the light originally emitted from the light source is available to reach the targeted area (98.000%× 98.000%×98.000%×98.000%×98.000%=90.392%). Thus, a mere 8% improvement in the reflectivity of the material used to fabricate the reflectors in a lighting fixture can result in a 30% increase in lighting efficiency.

BRIEF SUMMARY OF THE INVENTION

The present invention provides a light reflecting polymeric composition that comprises at least one halogenated-flame-retardant-additive-free polymer having dispersed therein a pigment package including a combination of $Sb_2O_3$ and $TiO_2$. The $Sb_2O_3$ and $TiO_2$ preferably have an average particle size within the range of from about 0.05 µm to about 1.0 µm, and more preferably about 0.2 µm. When used in combination, the $Sb_2O_3$ and $TiO_2$ pigments combine to synergistically provide a polymeric composition that exhibits a reflectivity in the visible range of the electromagnetic spectrum that is substantially higher than can be obtained via the use of either of the two pigment components alone. Organic optical brighteners can optionally be included in the polymeric composition to further improve and adjust the reflectivity of the polymeric material, particularly in the 400 to 450 nm range. Polyolefins, and polypropylene in particular, are the presently most preferred polymers for use in the invention.

Light reflective polymeric compositions according to the invention provide substantial benefits as compared to the prior art. The compositions are UV stable, resistant to high temperatures, and can be processed using conventional equipment into to a variety of products such as films and injection-molded components. Light reflective polymeric compositions according to the invention provide superior reflectivity (~98%) performance and/or lower cost than conventional reflective systems such as, for example, reflective pre-painted white steel (~86%), reflective pre-painted aluminum (~90%), reflective specular aluminum and metalized films (~95%), reflective (and expensive) fluoropolymer films (~97%). Light reflective polymeric compositions are suitable for use in a variety of applications including, for example, lighting fixtures and automotive instrument panel clusters that use emerging technologies such as LED's.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
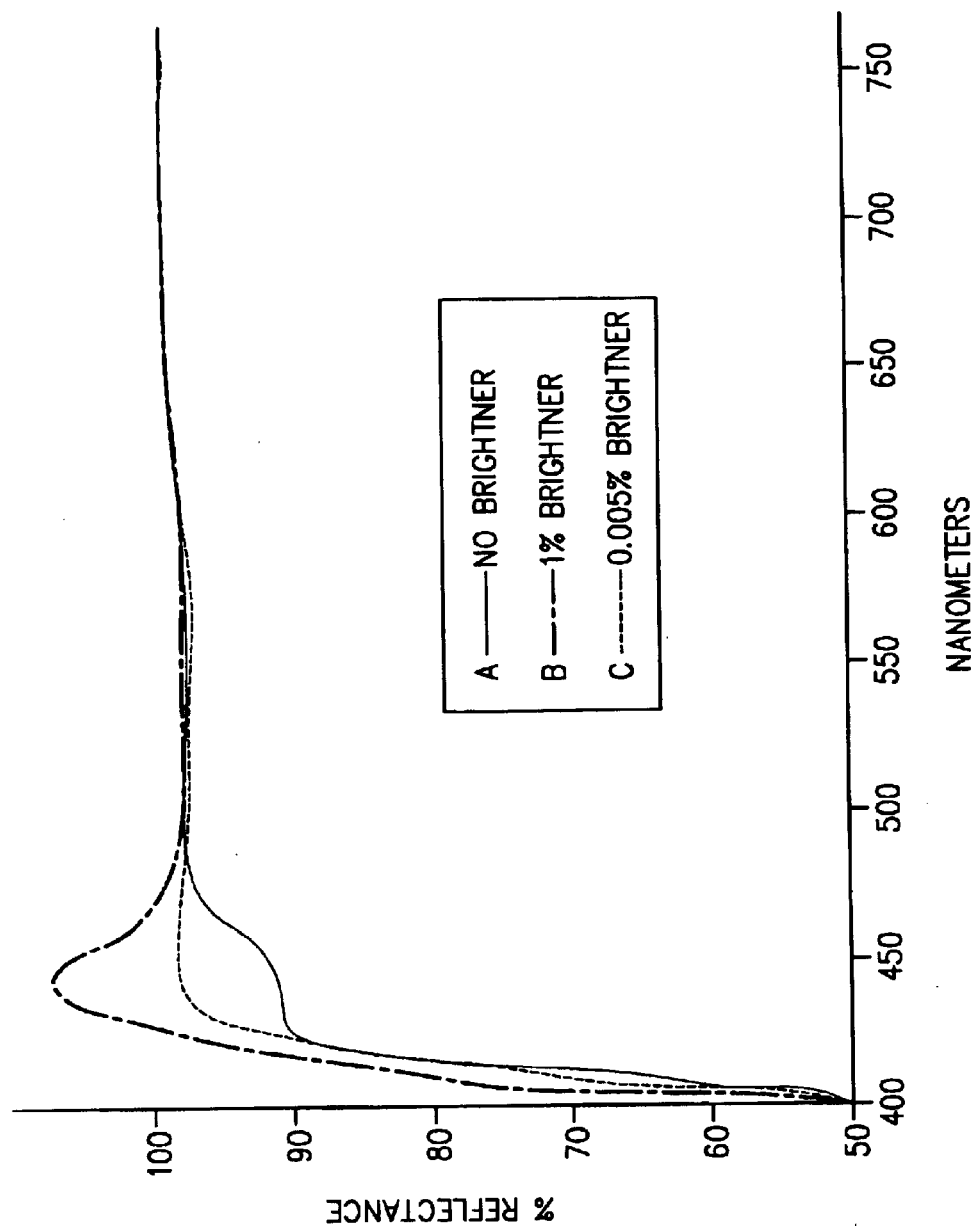
FIG. 1 is a graph showing percent reflectivity as a function of wavelength for various polymeric compositions in accordance with the invention.

Light reflecting polymeric compositions according to the present invention comprise at least one halogenated-flame-retardant-additive-free polymer having dispersed therein a pigment package comprising a combination of $Sb_2O_3$ and $TiO_2$. Throughout the instant specification and in the appended claims, the term "halogenated-flame-retardant-additive-free polymer" means a polymer that does not contain a halogenated-flame-retardant-additive such as, for example, brominated polystyrene, dibromoneopentyl glycol, hexabromocyclododecane, and tetrabromobisphenol-A. Suitable polymers for use in the invention include, for example, polyolefins, styrenic polymers, polyamides, polyesters, polyacrylics, polycarbonates, engineering resins such as liquid crystal polymers, and copolymers and polymer blends and alloys of the foregoing. Polypropylene is a particularly preferred polymer for use in the invention.

In accordance with the invention, light reflecting polymeric compositions are formed by dispersing the pigment package in at least one polymer or a blend of polymers, typically by melt-mixing in an extruder. Applicants have surprisingly discovered that dispersing a pigment package comprising a combination of $Sb_2O_3$ and $TiO_2$ in at least one polymer results in a substantial improvement in the reflectivity of the resulting polymeric composition in that portion of the electromagnetic spectrum from about 450 nm to about 700 nm than can be obtained via the use of either of the two pigment components alone.

Specular reflection (gloss) occurs when a small fraction of light (generally between one and ten percent) reflected at the first surface of the object is unchanged. On a rough or matte surface, light is scattered in many directions that are visible to the observer. Scattering occurs when light energy encounters particles and is redirected or refracted. The refractive index of a material identifies how much light is slowed down (redirected or refracted) compared to the air, which is assigned an index of one. Scattering is responsible for the opacity or hiding power of a colorant. Without being bound to a particular theory, applicants postulate that the observed synergy in reflective provided by the light reflective polymeric compositions according to the invention results from the combination of particle size, distribution, opacity, hiding strength, and the close proximity of the refractive indices of the pigment systems ($Sb_2O_3$ and $TiO_2$) within the polymeric (e.g., polypropylene) matrix.

Pigment grade $TiO_2$ is widely available and is often used as an opacifier and/or whitener in a variety of polymer systems. $Sb_2O_3$ is more expensive than $TiO_2$, and "white" $Sb_2O_3$ is not a particularly effective opacifier or whitener. Small amounts of relatively coarse $Sb_2O_3$ particles (e.g., average particle size of from about 0.8 µm to about 1.0 µm) are sometimes used in polymer systems as synergists for halogenated-flame-retardant-additives. But, $Sb_2O_3$ is seldom used as a pigment in polymer systems.

The pigment package in the light reflecting polymeric compositions according to the present invention preferably comprises from about 10% to about 60% by weight $Sb_2O_3$ and from about 40% to about 90% by weight $TiO_2$. Any combination within that range, such as, for example, a 50%/50% mixture of $TiO_2$ and $Sb_2O_3$ pigments, can be used.

It has been determined that the particle size of both the $TiO_2$ and $Sb_2O_3$ pigments in the pigment package has an significant effect on the reflectivity of the polymeric composition. Preferably, the $TiO_2$ and $Sb_2O_3$ pigments both have an average particle size of from about 0.05 µm to about 1.0 µm, more preferably from about 0.1 µm to about 0.3 µm, and most preferably about 0.2 µm. Thus, the $Sb_2O_3$ pigments used in the pigment package according to the invention are substantially smaller than $Sb_2O_3$ particles typically used as synergists for halogenated-flame-retardant-additives. The ratio of polymer to pigment package dispersed therein is preferably from about 100:1 to about 3:1 by weight, more preferably from about 20:1 to about 5:1 by weight, and most preferably from about 12:1 to about 8:1 by weight.

In a particularly preferred embodiment of the invention, the light reflecting polymeric composition comprises from about 75 parts to about 95 parts by weight of a halogenated-flame-retardant-additive-free polyolefin having dispersed therein from about 5 to about 25 parts by weight of a pigment package comprising a combination of $TiO_2$ and $Sb_2O_3$. The polyolefin is preferably a homopolymer of polypropylene. A polymeric composition such as just described will typically reflect 98.0% or more of light throughout that portion of the electromagnetic spectrum ranging from 450 nm to 700 nm.

It will be appreciated that conventional additives and/or polymeric modifiers such as antioxidants, lubricants, impact modifiers, and fillers, can be added to the polymer or polymers without significantly affecting the reflectivity of the resulting polymeric composition. Examples of fillers employed in a typical light reflecting polymeric composition according to the present invention included talc, calcium carbonate, mica, wollasnite, dolomite, glass fibers, boron fibers, carbon fibers, pigments, or mixtures thereof. Preferred fillers include commercially available talc such as R. T. Vanderbilt's Select-O-Sorb and glass fibers. The amount of filler and fibers included in the light reflecting polymeric compositions of the present invention may vary from about 1% to about 70% of the combined weight of polymer in filler. Generally, amounts of from 5% to 30% are utilized.

The fillers and fibers may be treated with coupling agents to improve the bond between the fillers and fibers to the resin. For example, the fillers can be treated with materials such as fatty acids (e.g., stearic acid), silanes, maleated polypropylene, etc. The amount of coupling agents used is an amount effective to improve the bond between the fillers and fibers with the resin. Other additives may be included in the polymer blends of the present invention to modify or to obtain desirable properties. For example, stabilizers and inhibitors of oxidative, thermal and ultraviolet light degradation may be included in the polymer blends as well as lubricants and mold release agents, colorants including dyes and pigments, nucleating agents, plasticizers, etc., may be included in the polymer blends.

The stabilizers can be incorporated into the composition at any stage in the preparation of the polymer blends, and preferably, the stabilizers are included early to preclude the initiation of degradation before the composition can be protected. The oxidative and thermal stabilizers useful in the polymer blends of the present invention include those used in addition polymers generally. They include, for example, up to about 1% by weight, based on the weight of the polymer blend, of Group I metal halides such as sodium, potassium, lithium and cuprous halides (e.g., chloride, bromide, and iodide), hindered phenols, hydroquinones, and various substituted derivatives of these materials and combinations thereof.

The ultraviolet light stabilizers may be included in amounts of up to about 2% by weight based on the weight of the polymer blend. Examples of ultraviolet light stabilizers include various substituted resorcinols, salicylates, benzotriazoles, benzophenones, etc.

Suitable lubricants and mold release agents may be included in amounts of up to about 1% by weight based on the weight of the polymer blend include materials such as stearic acid, stearic alcohol, stearamides, organic dies such as nigrosine, pigments such as titanium dioxide, cadmium sulfide, etc. The plasticizers which may be included in amounts of up to about 20% by weight based on the weight of the polymer blend include materials such as dioctylphthalate, bibenzylphthalate, butylbenzophthalate, hydrocarbon oils, sulfonamides such as paratoluene ethyl sulfonamides, etc.

In order to improve the reflectivity of the polymeric material, particularly in the 400 nm to 450 nm range of the electromagnetic spectrum, one or more organic optical brighteners, such as benzoxazole derivatives, can also be used. Organic optical brighteners can also be used to balance and fine-tune the reflectivity of the material. To illustrate this point, reference is made to FIG. 1, which shows a typical plot of percent reflectivity as a function of wavelength for a polymeric composition in accordance with the invention. Plot A shown in FIG. 1 is for a composition that contained a combination of $TiO_2$ and $Sb_2O_3$, but no optical brightener. Plot B shown in FIG. 1 is for a composition that contained the same combination of $TiO_2$ and $Sb_2O_3$ plus 1.0% by weight of an optical brightener. Plot C shown in FIG. 1 is for a composition that contained the same combination of $TiO_2$ and $Sb_2O_3$ plus 0.003% by weight of an optical brightener. Note how the percent reflectivity in Plot C is relatively unchanged from 450 nm to 700 nm. This is highly desirable, as the reflected light will have a "balanced" natural appearance.

Polymeric compositions in accordance with the present invention are suitable for use in a variety of applications including, for example, automobile instrument panel clusters, lighting fixtures and housings, computer screens (e.g., lap top computers), and PDA ("personal digital assistant") displays. Polymeric compositions according to the invention reflect a higher percentage of light than conventional polymeric compositions, which improves the energy efficiency of lighting and reduces the amount of energy needed to obtain the required lighting for a particular end-use application.

The following examples are intended only to illustrate the invention and should not be construed as imposing limitations upon the claims.

EXAMPLE 1

Light Reflecting Polymeric Compositions A and B were each separately formed by melt mixing, in an extruder, the various components listed in weight percent in Table 1 below:

TABLE 1

| COMPONENT | A | B |
|---|---|---|
| Polymer | | |
| Polypropylene Homopolymer - 12 melt flow | 89.300 | 83.297 |
| Pigment Package | | |
| $Sb_2O_3$ - 0.2 µm average particle size | 5.000 | 3.500 |
| $TiO_2$ - 0.2 µm average particle size) | 5.000 | 12.500 |
| Antioxidants | | |
| Pentaerythritol Tetrakis(3-(3,5-di-tert-butyl-4-hydroxyphenyl)propionate) | 0.250 | 0.250 |
| Tris(2,4-ditert-butylphenyl)phosphite | 0.250 | 0.250 |
| Distearyl thiodipropionate | 0.100 | 0.100 |
| Lubricants | | |
| Zinc Stearate | 0.080 | 0.080 |
| Zinc Dibutyl Dithiocarbamate | 0.020 | 0.020 |
| Optical Brightener | | |
| 2,5-thiophenediylbis(5-tert-butyl-1,3-benzoxazole) | — | 0.003 |
| Total | 100.000 | 100.000 |

The compositions were then each molded into sheets approximately 10 mil thick and 10 inches wide using a laboratory cast film line (Killion, 1" single screw extruder with standard chill rolls) using conventional polypropylene processing conditions (375–425° C.).

Composition B, in particular, provides superior opacity. Thus, it is suitable for use in forming instrument clusters and other parts by injection molding techniques.

Comparative Example 2

Figure 2:
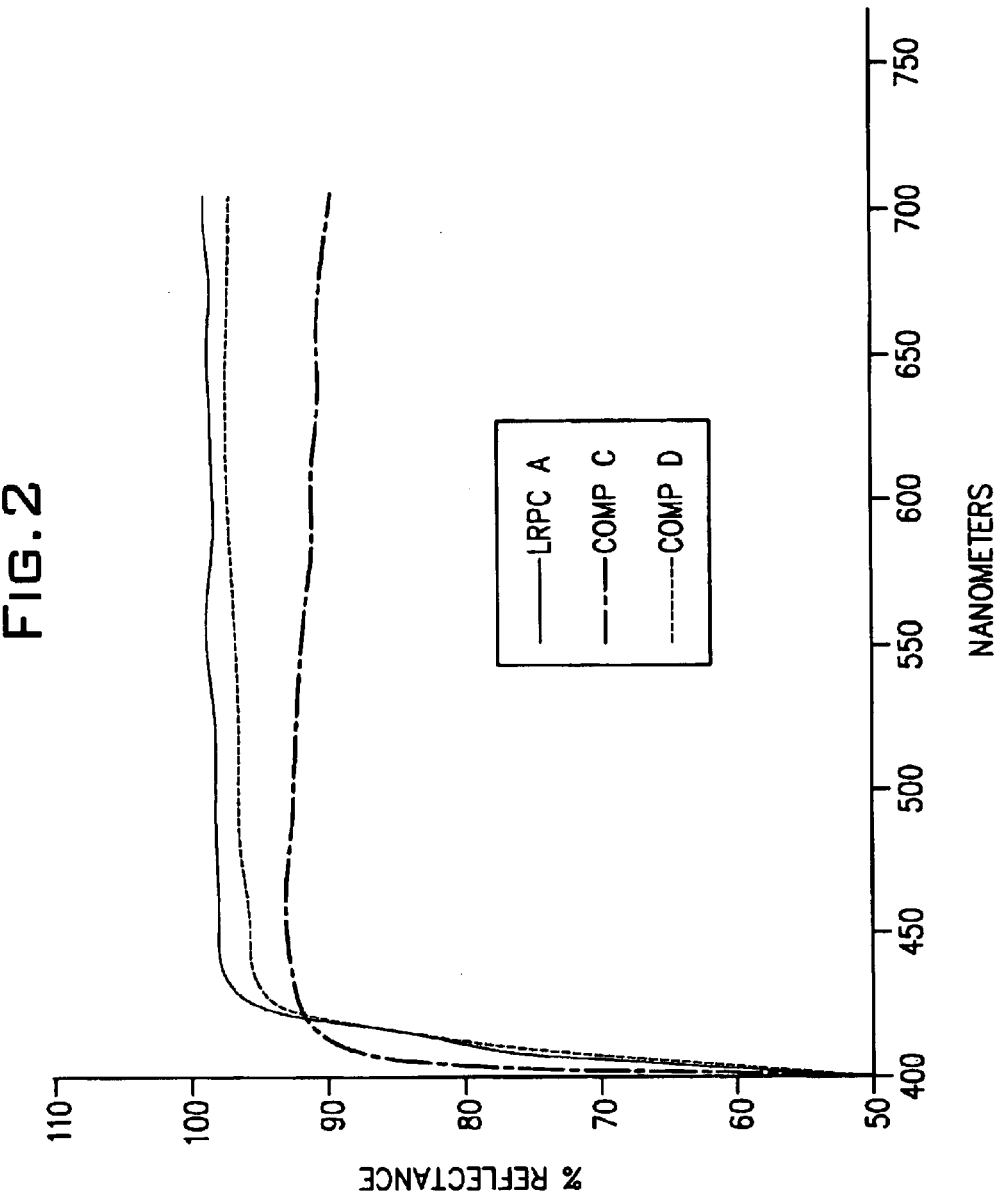
FIG. 2 is a graph showing percent reflectivity as a function of wavelength for the polymeric compositions formed in Examples 1 and 2.

Polymeric Composition C was prepared using the same formulation as Light Reflecting Composition A in Example 1, except that the pigment package for Composition C consisted of 10.000% by weight $TiO_2$ only and no $Sb_2O_3$. Polymeric Composition D was prepared using the same formulation as Light Reflecting Composition B in Example 1, except that the pigment package for Composition D consisted of 16.000% by weight $Sb_2O_3$ only and no $TiO_2$. As shown in FIG. 2, the reflectivity of Light Reflecting Polymeric Composition A from 450 nm to 700 nm was significantly higher than the reflectivity of Compositions C and D. Light Reflecting Polymeric Composition A exhibited a reflectivity of about 98.0% from about 450 nm to about 700 nm.

Comparative Example 3

Figure 3:
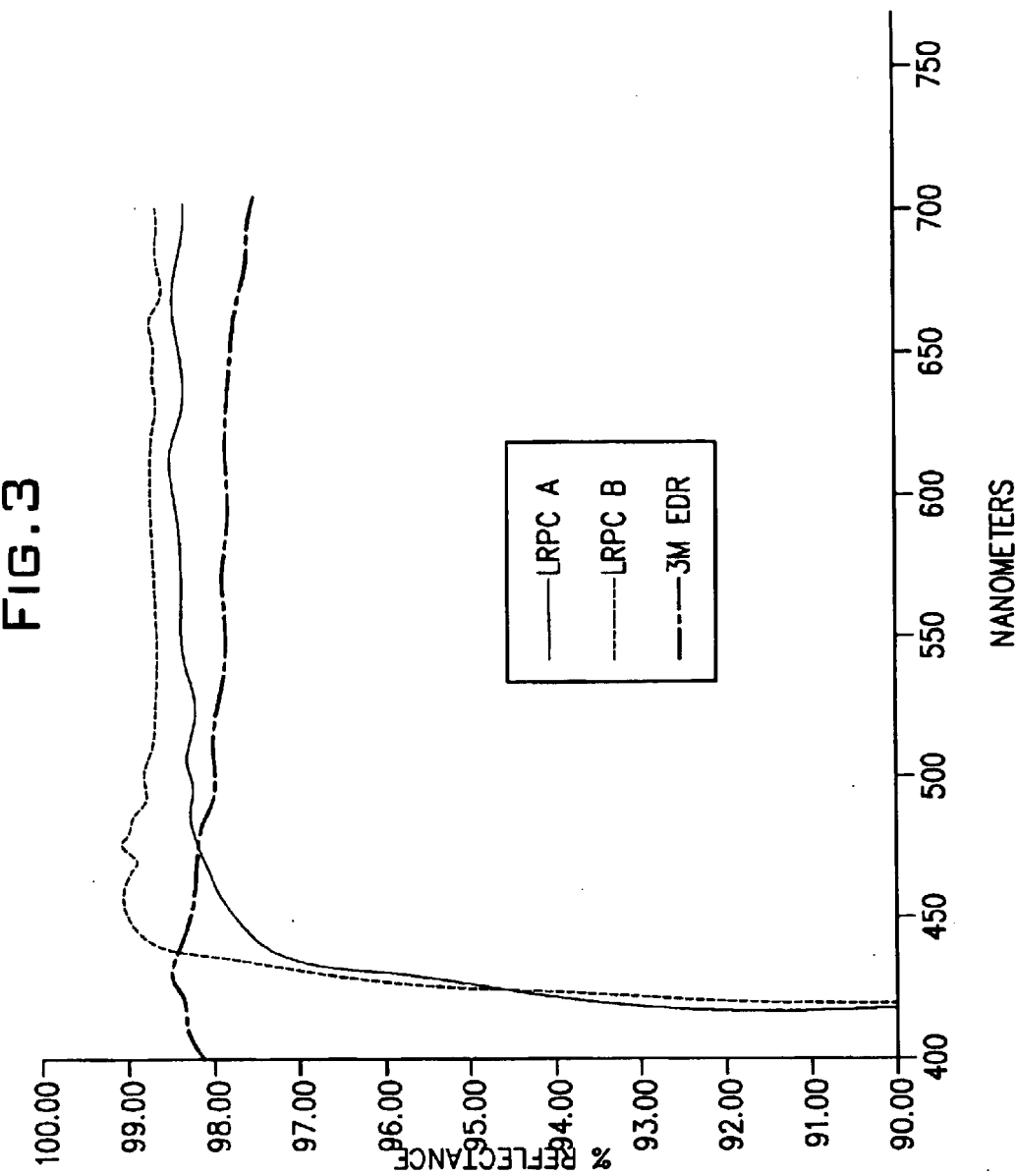
FIG. 3 is a graph showing percent reflectivity as a function of wavelength for the polymeric compositions formed in Example 1 versus a commercially available highly reflective polymeric material.

As shown in FIG. 3, the reflectivity of Light Reflecting Polymeric Compositions A and B from 450 nm to 700 nm was significantly higher than the reflectivity of a highly reflective film sold by the 3M Corporation under the trade designation VIKUITI Enhanced Diffuse Reflector (EDR) film. Light Reflecting Polymeric Composition A exhibited a reflectivity of about 96.0% from about 450 nm to about 700 nm. Light Reflecting Polymeric Composition B exhibited a reflectivity of about 97.5% from about 450 nm to about 700 nm. The 3M EDR Film exhibited a reflectivity of around 90.0% over the same range.

EXAMPLE 4

Light Reflecting Polymeric Composition F was formed by melt mixing, in an extruder, the various components listed in weight percent in Table 2 below:

TABLE 2

| COMPONENT | F |
|---|---|
| Polymer | |
| Polypropylene Homopolymer - 12 melt flow | 77.297 |
| Pigment Package | |
| $Sb_2O_3$ - 0.2 µm average particle size | 3.500 |
| $TiO_2$ - 0.2 µm average particle size) | 12.500 |
| Antioxidants | |
| Pentaerythritol Tetrakis(3-(3,5-di-tert-butyl-4-hydroxyphenyl)propionate) | 0.250 |
| Tris(2,4-ditert-butylphenyl)phosphite | 0.250 |
| Distearyl thiodipropionate | 0.100 |
| Lubricants | |
| Zinc Stearate | 0.080 |
| Zinc Dibutyl Dithiocarbamate | 0.020 |
| Optical Brightener | |
| 2,5-thiophenediylbis(5-tert-butyl-1,3-benzoxazole) | 0.003 |
| Filler | |
| Chopped Strand Fiberglass (Owens Corning 147A14P) | 6.000 |
| Total | 100.000 |

As a result of the incorporation of chopped fiber, Composition F provides high light reflectance and excellent heat resistance and stiffness. Composition F is thus particularly suitable for injection molding parts such as fluorescent lighting fixtures and other products.

Comparative Example 5

Strobe Chamber Housing 1 was formed from injection molded polybutylene terephthalate (PBT, General Electric's Valex CS8060 Color WH6085) and then covered with an adhesive-backed film of White Star Reflector Material available from W. L. Gore & Associates, Inc. Strobe Chamber Housings 2 and 3 were each formed from Composition B described in Example 1 above. Strobe Chamber Housing 2 was slightly textured to provide a "sand blasted" surface appearance whereas Strobe Chamber Housing 3 maintained its "shiny" original surface appearance. Strobe Chamber Housings 1, 2 and 3 were each tested in accordance with UL1638 (and also UL 1971 and CAN/ULC S526-M87) to measure the light output. Horizontal Data is shown in Table 3 below:

TABLE 3

| Angle | UL Limit | Housing 1 | Housing 2 | Housing 3 |
|---|---|---|---|---|
| 0 | 177 | 210.5 | 204.5 | 197 |
| 5 | 159.3 | 211 | 203 | 198 |
| 10 | 159.3 | 209 | 202 | 199 |
| 15 | 159.3 | 207 | 199 | 196 |
| 20 | 159.3 | 202 | 195 | 190 |
| 25 | 159.3 | 199 | 192 | 186 |
| 30 | 132.75 | 190 | 188 | 182 |
| 35 | 132.75 | 184 | 178.2 | 173 |
| 40 | 132.75 | 174 | 168 | 163 |
| 45 | 132.75 | 165 | 160 | 156 |
| 50 | 97.35 | 153 | 149 | 144 |
| 55 | 79.65 | 142 | 140 | 136 |
| 60 | 70.8 | 131 | 127 | 124.8 |
| 65 | 61.95 | 118 | 116 | 114.6 |
| 70 | 61.95 | 106 | 104 | 101.9 |
| 75 | 53.1 | 94.5 | 92.2 | 92.5 |
| 80 | 53.1 | 91.6 | 82.8 | 82.1 |
| 85 | 44.25 | 70.1 | 60.5 | 73 |
| 90 | 44.25 | 36.8 | 16* | 13.5* |

Figure 4:
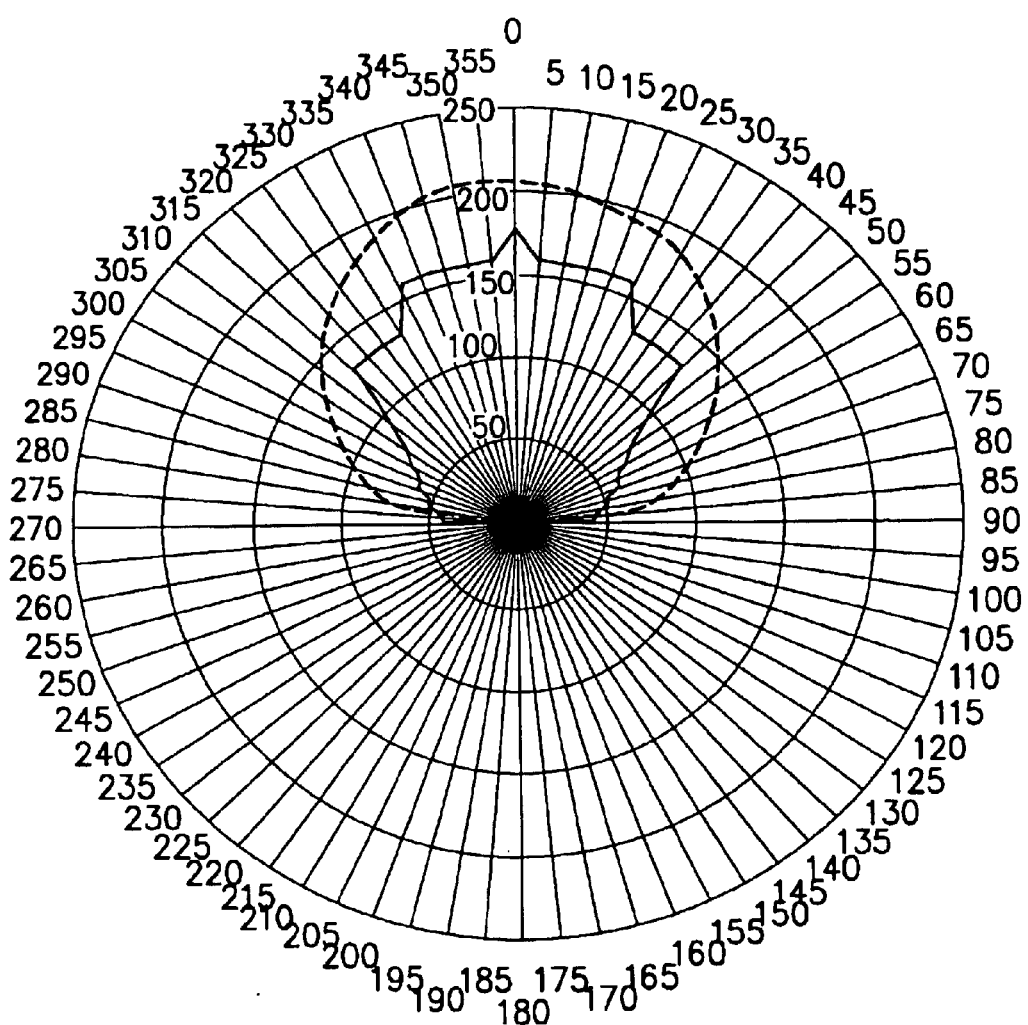
FIG. 4 is a graph showing the horizontal light output profile for a reflector made from a light reflective polymeric composition according to the present invention as compared to the UL Limit as measured in accordance with UL 1638 (and also UL 1971 and CAN/ULC S526-M87).

It should be noted that the out-of-range 90 degree data point can easily be corrected simply by adjusting the design of the Strobe Chamber Housing, which is well within the ability of one skilled in the art. FIG. 4 graphically shows the horizontal light output profile of Strobe Chamber Housing 2 (shown in dashed lines) as compared to the UL Limit (shown in solid lines) as measured in accordance with UL 1638 (and also UL 1971 and CAN/ULC S526-M87). The results demonstrate that relatively expensive, time consuming reflective film can be replaced by lower cost injection molded material according to the invention.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A light reflecting polymeric composition that is free of halogenated flame retardant additives, said polymeric composition comprising a polymer having dispersed therein a pigment package comprising a combination of from about 10% to about 60% by weight of particles of $Sb_2O_3$ and from about 40% to about 90% by weight of particles of $TiO_2$, wherein the ratio of polymer to pigment package is from about 100:1 to about 3:1 by weight, and wherein the $Sb_2O_3$ and $TiO_2$ in said pigment package both have an average particle size within the range of from about 0.1 μm to about 0.3 μm.

2. The light reflecting polymeric composition according to claim 1 wherein said pigment package comprises about 50% $Sb_2O_3$ particles and about 50% $TiO_2$ particles by weight.

3. The light reflecting polymeric composition according to claim 1 wherein said pigment package comprises about 22% $Sb_2O_3$ particles by weight and about 78% $TiO_2$ particles by weight.

4. The light reflecting polymeric composition of claim 1 wherein the ratio of polymer to pigment package is from about 20:1 to about 5:1 by weight.

5. The light reflecting polymeric composition of claim 1 wherein the ratio of polymer to pigment package is from about 12:1 to about 8:1 by weight.

6. The light reflecting polymeric composition of claim 4 wherein the pigment package comprises about 50% $Sb_2O_3$ particles and about 50% $TiO_2$ particles by weight.

7. The light reflecting polymeric composition of claim 4 wherein the pigment package comprises about 22% $Sb_2O_3$ particles and about 78% $TiO_2$ particles by weight.

8. The light reflecting polymeric composition of claim 5 wherein the composition has a light reflectivity of at least about 96.0% from about 450 nm to about 700 nm.

9. The light reflecting polymeric composition according to claim 1 wherein an organic optical brightener is dispersed in the polymer.

10. The light reflecting polymeric composition according to claim 1 wherein one or more antioxidants is dispersed in the polymer.

11. A light reflecting polymeric composition that is free of halogenated flame retardant additives, said polymeric composition comprising from about 75 to about 95 parts by weight of a polyolefin having dispersed therein from about 5 to about 25 parts by weight of a pigment package comprising a combination of from about 10% to about 60% $Sb_2O_3$ particles by weight and from about 40% to about 90% $TiO_2$ particles by weight, wherein the $Sb_2O_3$ and $TiO_2$ particles in said pigment package have an average particle size within the range of from about 0.1 μm to about 0.3 μm.

12. The light reflecting polymeric composition according to claim 11 wherein an organic optical brightener is dispersed in the polyolefin.

13. The light reflecting polymeric composition according to claim 12 wherein one or more antioxidants are dispersed in the polyolefin.

14. The light reflecting polymeric composition according to claim 11 wherein said polyolefin comprises a homopolymer of polypropylene.

15. The light reflecting polymeric composition of claim 11 wherein the ratio of polymer to pigment package is from about 20:1 to about 5:1 by weight.

16. The light reflecting polymeric composition of claim 11 wherein the ratio of polymer to pigment package is from about 12:1 to about 8:1 by weight.

17. The light reflecting polymeric composition of claim 11 wherein the pigment package comprises about 50% $Sb_2O_3$ particles and about 50% $TiO_2$ particles by weight.

18. The light reflecting polymeric composition of claim 11 wherein the pigment package comprises about 22% $Sb_2O_3$ particles and about 78% $TiO_2$ particles by weight.

19. The light reflecting polymeric composition of claim 15 wherein the composition has a light reflectivity of at least about 96.0% from about 450 nm to about 700 nm.

* * * * *